G. T. STAMM.
MACHINE FOR WASHING FRUIT.
APPLICATION FILED NOV. 8, 1915.
1,205,117.
Patented Nov. 14, 1916.
3 SHEETS—SHEET 2.
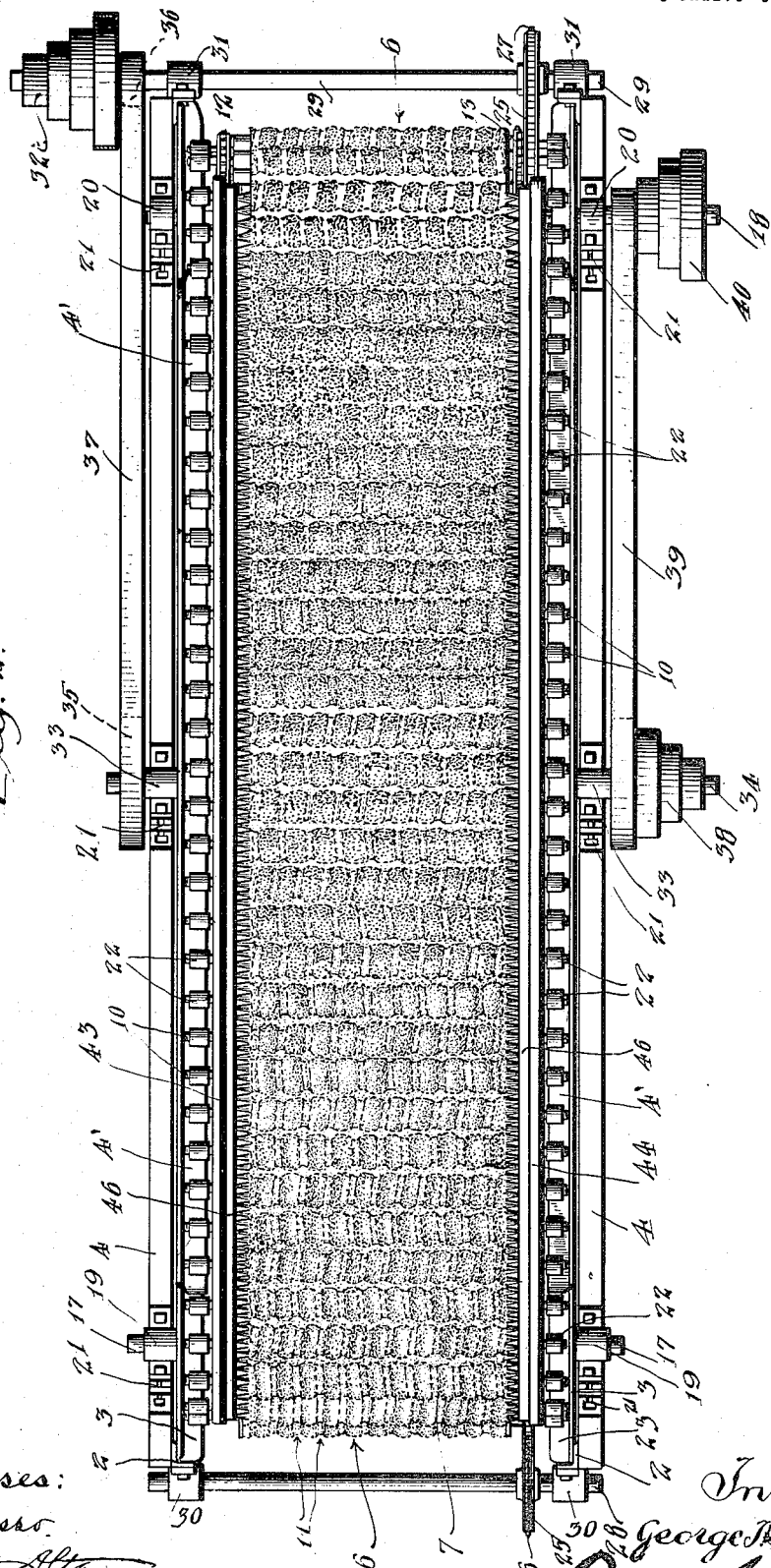

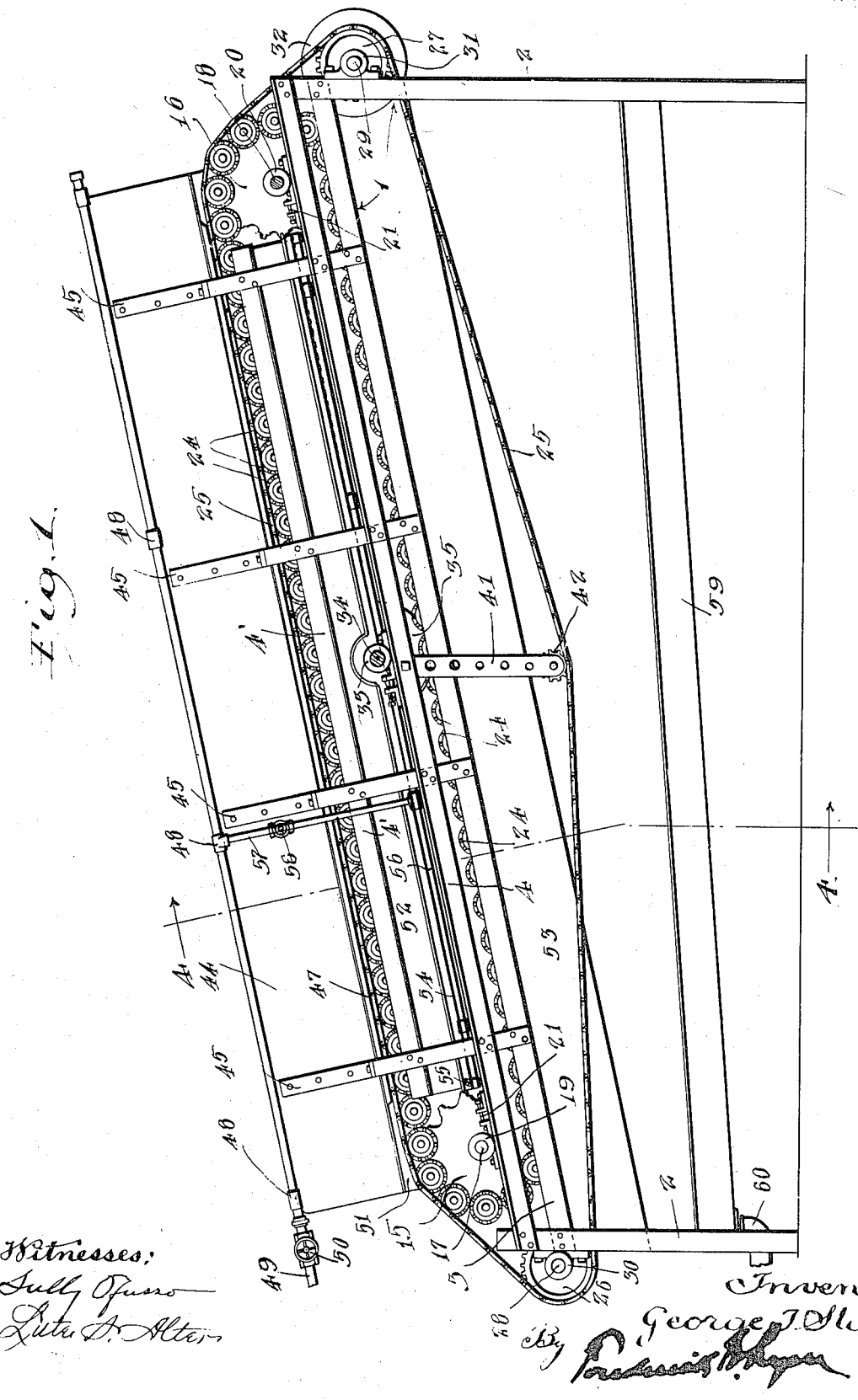

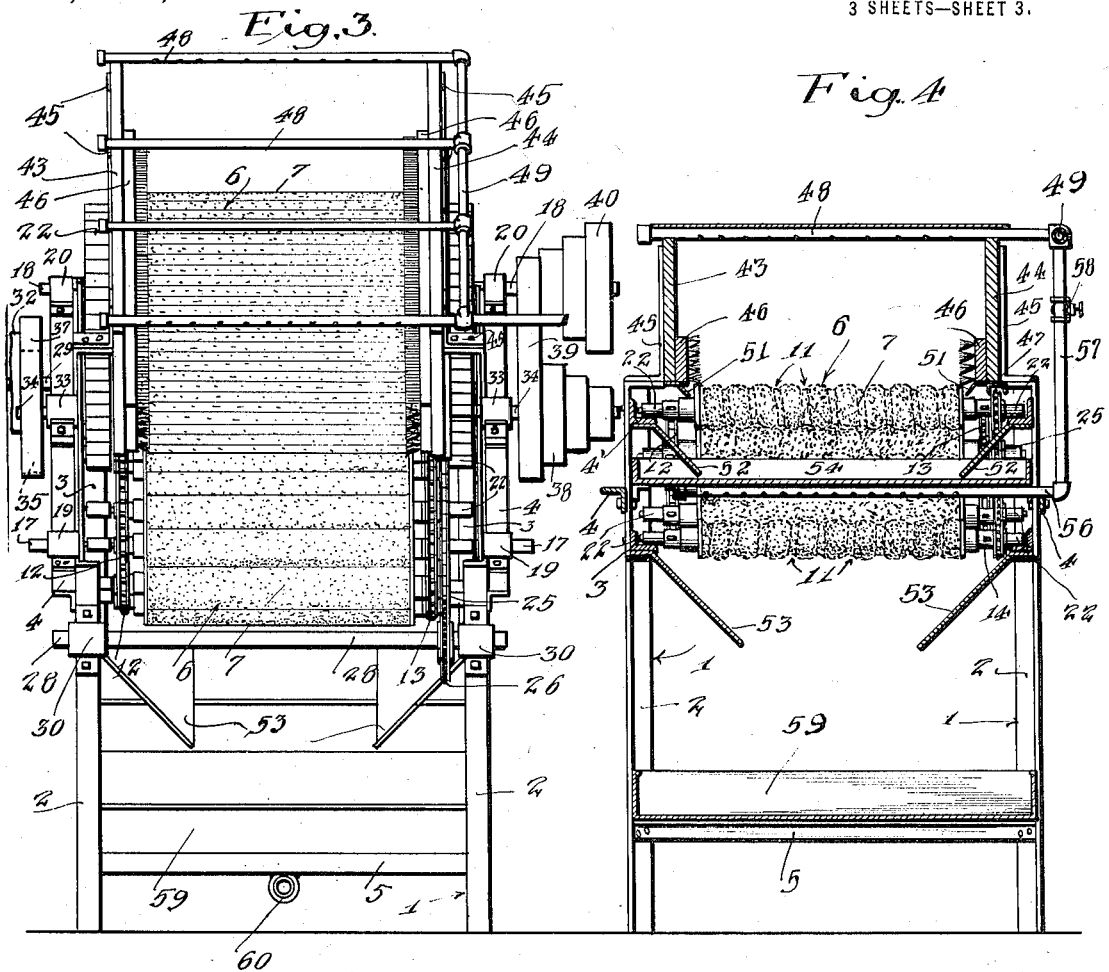
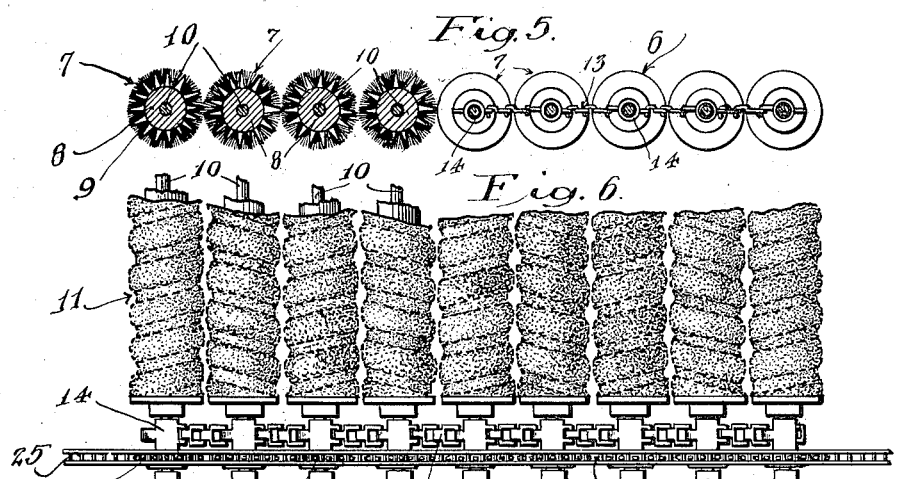

UNITED STATES PATENT OFFICE.

GEORGE THEODORE STAMM, OF UPLAND, CALIFORNIA.

MACHINE FOR WASHING FRUIT.

1,205,117.   Specification of Letters Patent.   Patented Nov. 14, 1916.

Application filed November 8, 1915.   Serial No. 60,241.

*To all whom it may concern:*

Be it known that I, GEORGE T. STAMM, a citizen of the United States, residing at Upland, in the county of San Bernardino and State of California, have invented a new and useful Machine for Washing Fruit, of which the following is a specification.

This invention relates to washing machines for oranges and other fruit and the primary object is to provide a washer which is capable of washing a large quantity of fruit thoroughly, expeditiously and without bruising or removing the skin from the fruit.

Another object of this invention is to provide a fruit washer which will act as an elevator or conveyer so that the fruit while being washed may be conveyed to a drier or elevated to the desired level for packing or other purposes.

Another object of this invention is to provide for the turning over of the fruit a number of times and in various directions while it is upon the washing means, thus causing the entire surface of each piece of fruit to be subjected to a washing action.

An object of this invention is to provide a washing machine in which while the fruit is conveyed therethrough it shall be subjected to brushing means and to means causing the fruit to be moved laterally with respect to the surface of the conveyer so as to insure all parts of the surface of the fruit being subjected to the washing and brushing action.

A further object is to provide a washing machine of the character described which may be constructed simply and operated at a low cost.

Other objects and advantages will appear in the course of the following description.

The accompanying drawings illustrate the invention.

Figure 1 is a side elevation of the machine. Fig. 2 is a top plan view with the top removed. Fig. 3 is an end elevation with the top removed. Fig. 4 is a vertical sectional view taken on line 4—4 of Fig. 1. Fig. 5 is an enlarged cross sectional view of the conveyer in detail. Fig. 6 is an enlarged fragmentary plan view of the conveyer.

In the drawings I have illustrated the preferred form of embodying my invention in a machine for this purpose, and it will be understood that I do not confine myself to this particular embodiment as the invention may be embodied in various different forms.

Referring to the drawings by characters of reference, 1 designates as an entirety a frame which comprises upright standards 2, longitudinal angle bars 3, 4 and 4' which are connected with the standards and transverse bars 5 secured to the standards below the bars 3 and 4. A pair of these bars 3 and 4 is mounted upon each side of the frame inside of the standards 2 and the bars of each pair are spaced from one another for the purpose to be later more fully described. The bars 4' are mounted on the outside of the standards 2 between the bars 3 and 4.

Preferably there is provided means for conveying, rotating and laterally moving the fruit, which includes rotary washing brushes that contact with the fruit. In this instance the conveyer is shown as inclined and serves to elevate fruit placed thereon but may be arranged in a horizontal or other planes if so desired. The conveyer 6 comprises a plurality of rotatable fruit supporting and washing members or brushes 7 which are mounted transversely of the frame, are preferably circular in cross section and include cylindrical bodies 8 from which radially project stiff bristles 9. A shaft 10 extends through the body 8 of each brush and projects from the ends of the body. Each brush is formed with irregular fruit engaging surfaces preferably in the form of a spiral groove 11 and the brushes are arranged in slightly spaced and parallel relation to one another, the groove in one brush extending in one direction and in the next adjacent brush in the opposite direction so as to provide for the turning over of the fruit a number of times in various directions or in other words, moving the fruit laterally, back and forth. This will cause all of the outer surfaces of the fruit to be engaged by the bristles 9. It has been found that brushes having relatively stiff bristles such as above described serve best for washing and cleansing the fruit, but the washing members may consist of means other than such bristles, the only requirement being that said members must have roughened or surfaces of such character that the fruit contacting therewith will be briskly rubbed without being bruised or scraped. Chains 12 and 13 including bearings 14, which are connected between every two or three links as desired, are mounted upon sprockets 15 and 16 which are fixed upon shafts 17 and 18 at opposite ends of the frame 1. There are two sprockets 15, one on each side of the frame at one end of the frame, and two sprockets 16 arranged similarly at the other end of the frame, and the shafts 17 and 18 are journaled in bearings 19 and 20 which are mounted upon the upper angle bars 3 on opposite sides of the frame. These bearings 19 and 20 may be provided with adjustable mountings 21 and provide for the regulation of the tension of the chains 12 and 13.

The shafts 10 for the brushes 7 are journaled near their ends in the bearings 14 and at their ends are provided with anti-friction rollers 22 which ride upon the horizontal portions 23 of the angle bars 3 and 4.

A sprocket 24 is fixed upon one end of each of the shafts 10 for the brushes 7 and a chain 25 which is mounted upon sprockets 26 and 27 at the ends of the frame 1 engages the sprockets 24 on the upper side of the conveyer 6, as clearly shown in Fig. 1 in the drawings, said chain extending beneath the conveyer. The sprockets 26 and 27 are fixed upon shafts 28 and 29 which are journaled in bearings 30 and 31 at opposite ends of the frame 1. The shaft 29 which is located at the upper end of the frame 1, in this instance, has mounted thereon a step pulley 32 which is adapted for connection with a suitable source of power, not shown, and drives the shaft 29. Journaled transversely of the frame approximately centrally thereof and below the conveyer 6 in bearings 33 is a jack shaft 34 upon which is fixed a pulley 35. A smaller pulley 36 is fixed upon the shaft 29 and a belt 37 is mounted upon said pulleys 35 and 36. A step pulley 38 is mounted upon the other end of the shaft 34 and a belt 39 is mounted upon said step pulley and a similar step pulley 40 which is fixed to the shaft 18 on one end thereof. Through this system of pulleys and shafting the speed of rotation of the conveyer and of the brushes may be regulated as desired so that the washing and cleaning action of the brushes may be lessened or increased and the capacity of the device lowered or increased, and these regulations will depend upon the character and quantity of fruit being treated.

Depending from the longitudinal bar 3 and vertically adjustably attached thereto is an arm 41 on the lower end of which is carried an idler 42 which engages the chain 25. This arm 41 may be adjusted to regulate the tension of the chain 25.

Mounted on opposite sides of and above the conveyer 6 are guide plates 43 and 44 which extend approximately the full length of the conveyer and are held in upright position by means of upright extensions 45 that are secured to the frame 1. Mounted upon the inner faces of these plates 43 and 44 are longitudinal stationary brushes 46. These brushes are located slightly above the brushes 7 on the upper side of the conveyer and are designed to contact with the fruit and prevent bruising thereof against the sides of the plates 43 and 44 as well as to assist in the washing of the fruit. Carried underneath the plate 44 is a channel iron guard 47 which covers the upper part of the chain 25.

Mounted transversely of the conveyer 6 and resting upon the upper edges of the plates 43 and 44 are perforated liquid spray pipes 48 which are connected with a feed pipe 49 that is in turn connected with a source of liquid supply, not shown. The valve 50 is mounted in the pipe 49 and provides for the controlling of the flow of liquid to the pipes 48. The perforations in these pipes 48 are located on the under side thereof and are arranged so as to direct the spray of liquid downwardly in an inclined plane toward the lower end of the frame and upon the fruit on the conveyer. To prevent liquid from getting upon the chains 12, 13 and 25, the sprockets 24, 15 and 16 and other working parts which coöperate therewith, there is provided a series of downwardly and inwardly inclined deflector plates 51, 52 and 53, the plates 51 being mounted on the underside of the brushes 46; whereas, the plates 52 and 53 are secured to the under sides of the longitudinal bars 3 and 4.

Suitably supported upon the frame 1 above the lower half of the conveyer 6 is a drain pan 54 which extends approximately the full length of the conveyer and is provided with a suitable outlet 55. This pan is arranged beneath the deflector plates 52 and extending transversely across and below the pan are spray pipes 56 which are perforated and adapted to spray upon the brushes 7 of the lower half of the conveyer. A pipe 57 connects the spray pipes 56 with the feed pipe 49 and a valve 58 is mounted in the pipe 57 to control the flow of liquid to the pipes 56. Liquid from the pipes 48 which drops from the fruit and upper half of the conveyer 6 is dirty and carries with it particles of foreign matter washed from the fruit. The pan 54 catches this liquid and prevents it from coming into contact with the lower half of the conveyer. The plates 52 deflect this liquid into the pan 54 and prevent it from coming into contact with the working parts of the device that are located on opposite sides of the pan. The spray pipes 56 direct a spray upon the brushes 7 on the lower part of the conveyer and cause foreign matter and dirt adhering to the brushes to be washed therefrom. A large drain pan 59 is mounted upon the frame 1 on the bars 5 thereof and is adapted to receive liquid from the spray pipes 56. This pan 59 is preferably inclined and is provided with a suitable outlet 60.

In operation the fruit after having been soaked is placed upon the lower end of the conveyer, said conveyer being rotated from the lower to the upper end thereof. The fruit will quickly spread out in one layer upon the conveyer due to the rotation of the brushes 7, said rotation being in the direction of rotation of the conveyer. The irregular surfaces on the brushes, that is the spiral grooves 11, cause the fruit to be turned over a number of times and to be moved laterally, back and forth, thus bringing every portion of the outside surface of the fruit into contact with the bristles 9 of the brushes. The downwardly directed spray from the pipes 48 assists the brushes in washing the fruit and will move foreign matter such, for example, as portions of leaves or the like which may adhere to the fruit when removed from the soaking tanks. The stationary brushes 46 on the inner faces of the guide plates 43 and 44 engage some of the fruit and cause it to turn and dirt to be removed therefrom. Liquid from the spray pipes 48 will be deflected by the plates 51, 52 and into the pan 54 and may be withdrawn therefrom through the outlet 55. The dirty water from the fruit and upper half of the conveyer 6 falls into the pan 54 and is prevented coming into contact with the brushes 7 on the lower half of the conveyer. By means of the spray pipes 56 the brushes on the lower half of the conveyer are washed and foreign matter carried thereby is prevented from being carried around and engaged with the fruit. When the fruit reaches the upper end of the conveyer it has been thoroughly washed and may be removed in any suitable manner or caused to roll from the conveyer upon a platform, or mechanism for treating or packing the fruit, not shown.

The pulleys, shafting, gearing, etc., may be arranged so that the machine will operate to wash one, two, three or more car loads of fruit a day. For example, when the power belt, not shown, is upon the smaller portion of the step pulley 32 the machine will operate at a capacity of one car load a day and when upon the next larger portion of the pulley will have a capacity of two car loads a day. It will be seen that the capacity of the machine may be easily regulated as desired. Depending upon the character of the fruit the speed of rotation of the brushes 7 is made fast or slow. When the fruit is extremely dirty the brushes are caused to rotate rapidly without interfering with the desired speed of rotation of the conveyer 6. The relative speeds of the brushes and conveyer may be easily governed by shifting the belt 39 upon the pulleys 38 and 40 and the shifting of the power belt, not shown, upon the pulley 32. When the fruit is only slightly soiled the brushes may be rotated at a slow rate of speed.

One of the advantages of this embodiment of my invention is that owing to the fact that each brush has a surface irregularity, different from that of the next adjacent brush the entire outer surface of the fruit even when the fruit is flat on one side and has a peculiar shape will be caused to contact with the rotating brushes and in this way will be thoroughly cleaned.

I claim:

1. A fruit washing machine comprising a frame, a plurality of rotary washing and fruit supporting brushes mounted on said frame, means to rotate the said brushes, and means to move the brushes along the frame to convey the fruit.

2. A fruit washing machine comprising a frame, a plurality of rotary washing fruit supporting brushes mounted on said frame, means to rotate the brushes, and means to move the brushes bodily along the frame, said brushes having irregular fruit engaging surfaces.

3. A fruit washing machine comprising a frame, a plurality of rotary fruit supporting washing brushes mounted on the frame, means to move the brushes bodily along the frame to convey the fruit, and means to rotate the brushes in a direction corresponding to that of the bodily movement thereof.

4. A fruit washing machine comprising a frame, a plurality of rotary fruit washing and supporting brushes mounted on said frame, means to rotate the brushes to turn over and wash the fruit thereon, means to move the brushes along the frame to convey the fruit, and means to spray a fluid on the fruit while it is upon the brushes.

5. A fruit washing machine comprising a frame, an inclined conveyer mounted on the frame, said conveyer comprising a plurality of rotary fruit supporting brushes, means to rotate the brushes, and means to rotate the conveyer.

6. A fruit washing machine comprising a frame and a conveyer mounted on the frame, said conveyer comprising a plurality of rotary fruit supporting brushes, means to rotate the brushes, and means to rotate the conveyer, said brushes having spiral grooves therein.

7. A fruit washing machine comprising a frame, an inclined endless conveyer comprising a plurality of rotary fruit supporting brushes and located transversely to the line of movement of the conveyer, means to wet the fruit while on the carrier, means to rotate the brushes in the direction of rotation of the conveyer, guides mounted upon the frame on each side of the carrier, and fruit engaging brushes fixed to the guides.

8. A fruit washing machine comprising a frame, a conveyer mounted on the frame, said conveyer comprising a plurality of rotary fruit supporting and washing members, means to rotate the members, to rotate and wash the fruit contacting therewith, and means to rotate the conveyer, said members having irregular fruit engaging surfaces, said surfaces differing.

9. A fruit washing machine comprising a frame, a plurality of rotary fruit washing and supporting members movably mounted upon the frame, each of said members having an irregular fruit engaging surface, means to rotate the members whereby the fruit is moved laterally, back and forth, means to move said members bodily along the frame to convey the fruit, and stationary brushes on the sides of the members.

10. A fruit washing machine comprising a frame, an inclined endless conveyer mounted on the frame, means to rotate the conveyer, said conveyer comprising a plurality of rotary brushes, each of said brushes having an irregular fruit engaging surface, means to rotate the brushes, and stationary brushes on the sides of the conveyer.

11. A fruit washing machine comprising a frame, an endless conveyer mounted upon the frame and comprising a plurality of rotary brushes, means to rotate the brushes, guide plates mounted upon the frame on opposite sides of the conveyer, stationary brushes carried by the guide plates and located above the rotary brushes, and means to spray a liquid upon the fruit while on the conveyer.

12. A fruit washing machine comprising a frame, an endless conveyer mounted upon the frame and comprising a plurality of rotary brushes, means to rotate the brushes, guide plates mounted upon the frame on opposite sides of the conveyer, stationary brushes carried by the guide plates and located above the rotary brushes, and means to spray a liquid upon the fruit while on the conveyer, said brushes having irregular fruit engaging surfaces.

13. A fruit washing machine comprising a frame, sprockets mounted on the frame, chains mounted on the sprockets, fruit-supporting brushes rotatably mounted upon the chains, sprockets mounted on the brushes, chains mounted on said last named sprockets, and means to drive said chains.

14. In a fruit washing machine a frame, chains rotatably mounted on each side of the frame, bearings carried by the chains, shafts rotatably mounted in the bearings, fruit-supporting brushes fixed upon the shafts, means to rotate said shafts, and means to rotate the chains.

15. In a fruit washing machine a frame, sprockets mounted on said frame, chains mounted on the sprockets, fruit supporting and washing brushes rotatably mounted upon and movable with the chains, sprockets mounted on the frame, sprockets fixed to the brushes, and a chain mounted upon the last and second named sprockets.

16. In a fruit washing machine a frame, an endless conveyer mounted on the frame, said conveyer comprising a plurality of rotary fruit supporting and washing brushes, means to rotate said brushes, and means to spray liquid upon the members on the lower half of the conveyer.

17. A fruit washing machine comprising a frame, an endless conveyer mounted on the frame, said conveyer comprising a plurality of rotatable fruit supporting and washing members, means to rotate said members, means to spray liquid upon the upper side of the conveyer, a drain pan located underneath the upper side of the conveyer, and means to spray liquid upon the upper side of the lower half of the conveyer located below the drain pan.

18. In a fruit washing machine a frame, an endless conveyer mounted on the frame, and comprising a plurality of fruit supporting and washing members, means to spray liquid upon the fruit on the upper side of the conveyer, a drain pan located between the upper and lower sides of the conveyer to receive liquid dropping from the upper side of the conveyer and prevent it from contacting with the lower side thereof, means to spray liquid upon the upper face of the lower half of the conveyer, and a drain pan located beneath the conveyer.

19. A fruit washing machine comprising a frame, an endless conveyer mounted upon said frame and comprising a plurality of fruit supporting and washing members, means to spray liquid upon the fruit upon the conveyer, means to prevent liquid from dripping from the upper half of the conveyer upon the lower half of the conveyer, and means to spray liquid upon the lower half of the conveyer.

20. A fruit washing machine comprising a frame, an endless conveyer mounted upon said frame and comprising a plurality of fruit supporting and washing members, means to spray liquid upon the fruit upon the conveyer, means to prevent liquid from dripping from the upper half of the conveyer upon the lower half of the conveyer, means to spray liquid upon the lower half of the conveyer, a drain pan beneath the conveyer, and liquid deflecting plates carried by the frame above the drain pan on the sides thereof.

21. A fruit washing machine comprising a plurality of rotary washing and fruit supporting brushes, a frame supporting said brushes, means to move the brushes in a given direction along the frame, means for directly rotating the brushes, and means for controlling the speed of rotation of the brushes independent of the speed of the movement of the brushes along the frame.

22. In a fruit washing machine, a frame, a conveyer comprising a plurality of fruit supporting washing members mounted on the frame, means to rotate the conveyer, means to rotate said members, and means for varying the speed of rotation of said members independent of the speed of rotation of the conveyer.

23. A fruit washing machine comprising a frame, a longitudinally moving conveyer having a plurality of rotary fruit supporting washing members, means for moving said conveyer, and means for rotating said members independent of the movement of said conveyer.

24. A fruit washing machine having means for longitudinally conveying the fruit through the machine, including rotary washing brushes, means for moving said conveying means, means for rotating said brushes independent of the movement of the conveyer, the fruit being moved laterally with respect to the surface of said brushes while moving along thereby.

25. A fruit washing machine having a series of fruit supporting and washing brushes bodily movable through said machine, means for moving the said brushes, and means for rotating said brushes independent of their longitudinal movement.

26. A fruit washing machine having a conveyer for moving the fruit through the machine, rotary brushing means bodily movable therewith, means for causing rotation thereof, the fruit being moved transversely of the conveyer while rotated, and means for supplying liquid to the fruit.

27. A fruit washing machine having a conveyer for moving the fruit through the machine, rotary brushing means bodily movable therewith, means for moving the fruit transversely of the brushing means, means for moving said conveyer, and means for rotating said brushing means independent of the conveying movement.

28. A fruit washing machine having longitudinally and bodily movable brushing means, means for moving said brushing means longitudinally of the machine, and means for rotating said brushing means independent of such longitudinal movement.

29. A fruit washing machine having a conveyer, including rotary washing brushes arranged parallel to each other and transverse to the line of movement of the conveyer, and means for rotating said brushes, the rotation of said brushes simultaneously causing relative movement between said brushes and the fruit thereon transverse to the direction of bodily movement of said brushes.

In testimony whereof, I have hereunto set my hand, at Los Angeles, California, this 19th day of October, 1915.

GEORGE THEODORE STAMM.

In presence of—
CHAS. J. CHUNN,
L. BELLE WEAVER.